United States Patent
Korkama et al.

(10) Patent No.: US 9,764,601 B2
(45) Date of Patent: Sep. 19, 2017

(54) VEHICLE TIRE

(71) Applicant: Nokian Renkaat Oyj, Nokia (FI)

(72) Inventors: Tomi Korkama, Tampere (FI); Samu Lepisto, Tampere (FI); Niko Haanketo, Nokia (FI); Jorma Tikka, Tampere (FI)

(73) Assignee: NOKIAN RENKAAT OYJ, Nokia (FI)

( * ) Notice: Subject to any disclaimer, the term of this patent is extended or adjusted under 35 U.S.C. 154(b) by 296 days.

(21) Appl. No.: 14/598,736

(22) Filed: Jan. 16, 2015

(65) Prior Publication Data

US 2015/0202927 A1 Jul. 23, 2015

(30) Foreign Application Priority Data

Jan. 17, 2014 (FI) ...................................... 20145040

(51) Int. Cl.
*B60C 11/13* (2006.01)
*B60C 11/03* (2006.01)

(52) U.S. Cl.
CPC ... *B60C 11/1307* (2013.01); *B60C 2011/0341* (2013.01); *B60C 2011/0353* (2013.01); *B60C 2011/1338* (2013.04)

(58) Field of Classification Search
CPC ......... B60C 11/1307; B60C 2011/0341; B60C 2011/0353; B60C 2011/1338; B60C 11/11; B60C 11/0306; B60C 11/0309; B60C 11/0332; B60C 2011/133; B60C 11/1392; B60C 11/1384; B60C 11/1376
USPC .............. 152/209.18, 209.21, 902, 903
See application file for complete search history.

(56) References Cited

U.S. PATENT DOCUMENTS

| 5,373,882 A * | 12/1994 | Nakagawa .......... B60C 11/0302 152/209.28 |
| 2006/0048876 A1 | 3/2006 | Yamane et al. |
| 2006/0144492 A1 * | 7/2006 | Nguyen .................. B60C 11/11 152/209.23 |

(Continued)

FOREIGN PATENT DOCUMENTS

| CN | 1720150 A | 1/2006 |
| CN | 101835635 | 9/2010 |
| DE | 10 2010 016977 A1 | 11/2011 |

(Continued)

OTHER PUBLICATIONS

FI Search Report, dated Sep. 15, 2014, from corresponding FI Application.

(Continued)

*Primary Examiner* — Eric Hug
(74) *Attorney, Agent, or Firm* — Young & Thompson

(57) ABSTRACT

A vehicle tire (1), including a tread (2) which intended for rolling contact with a foundation, the tread 82) being formed with a tread pattern (20) which includes circumferential grooves (25) and transverse grooves (26) for removing water from a contact patch between the foundation and the tire (1). The circumferential groove (25) has its wall (251) formed with a flow deflector (259) reducing a width of the circumferential groove (25), commencing from the wall (251) of the circumferential groove (25), bypassing a reduced-width portion (250) of the circumferential groove (25), and continuing arcuately into the transverse groove (26) so as to turn into a wall (261) of the transverse groove (26).

15 Claims, 2 Drawing Sheets

(56) References Cited

U.S. PATENT DOCUMENTS

2008/0271827 A1    11/2008   Morrison et al.
2012/0018068 A1*   1/2012   Kiwaki ............... B60C 11/1353
                                                               152/209.18

FOREIGN PATENT DOCUMENTS

DE    10 2010 037698 A1    3/2012
EP         1 614 549 A1    1/2006

OTHER PUBLICATIONS

English translation of Chinese Office Action, dated Jun. 20, 2016, from corresponding Chinese Application No. 201510022159.8.
Chinese Office Action dated Jan. 17, 2017, with English translation; Application !No. 201510022159.8.

* cited by examiner

VEHICLE TIRE

FIELD OF THE INVENTION

The invention relates to a vehicle tire, comprising a tread which is intended for rolling contact against a foundation, said tread being formed with a tread pattern which comprises circumferential grooves and transverse grooves for removing water from a contact patch between the foundation and the tire.

BACKGROUND OF THE INVENTION

The vehicle tire has a tread with a function of establishing rolling contact with a foundation, such as a roadway. The tread is formed with a tread pattern featuring divergent grooves for providing the tread with tread blocks, i.e. the tread comprises blocks and grooves. The grooves have a purpose of enabling the water, possibly present on the foundation, to flow in a way to establish a contact as good and tight as possible between the tread, more specifically a tread block, and the roadway. The water present on the foundation is displaced by means of the grooves from under the tread blocks primarily sideways of the tire. Some of the water remains within confines of the grooves, whereby the tire rolls over the water in such a way that, at the rolling portion, the water runs along the grooves alongside the tread blocks past the rolling portion. Vehicle tires in road traffic service are legally required to have sufficiently deep grooves for the safe operation of a vehicle in fluctuating weather conditions.

The flow rate of water in a groove is naturally strongly dependent on the driving speed of a vehicle. The effect of grooves on the flow rate and volume flow of water is a significant factor in terms of contact between water and tire. In the event that the grooves are not able to displace a sufficient amount of water from the rolling portion, i.e. from the contact patch, the tire will climb onto the top of a water cushion present on the foundation for so-called aquaplaning, whereby the friction between tire and foundation disappears almost completely. Hence, it is an objective to provide such a design for the grooves that the flow of water in a groove is as efficient as possible.

In the prior art, the subject matter is discussed in EP 1614549, which discloses a tread pattern having a specific rotating direction and being vigorously divided by grooves into tread blocks, and being provided with transverse, inclined grooves which conduct water from the tread block area towards the circumferential grooves of the tire. Another teaching of the publication is that the intersection of inclined grooves and circumferential grooves can be provided with rounded edges.

SUMMARY OF THE INVENTION

It is an objective of the invention to further develop the flow characteristics of a groove for enhancing the flow of water in the groove. One objective is to develop the flow characteristics of a groove in a type of tire which is a so-called "inside/outside" tire, which is hence intended to be installed on a vehicle with a specific sidewall always for the outside/inside, but in which the rotating direction is not predetermined. In the event that both the installation direction and the rotating direction were determined, the same tire would have to be manufactured in two models, tires for the left side and for the right side of a vehicle, thus requiring a double number of e.g. manufacturing molds. If just the rotating direction were determined, the geometry of grooves could be optimized from the standpoint of water flow, but it may be necessary to make compromises regarding other properties of the tire. Another objective of the present invention is to attain the above-described characteristics in a manner as production friendly and efficient as possible in order to maintain the manufacturing costs as low as possible for a tire of top quality characteristics.

It is characteristic of the invention that the circumferential groove has its wall formed with a flow deflector reducing a width of the circumferential groove, commencing from the wall of the circumferential groove, bypassing a reduced-width portion of the circumferential groove, and continuing arcuately into the transverse groove so as to turn into a wall of the transverse groove.

This presented solution fulfills the set objectives. The flow deflector, which is arranged at what in water flowing direction is the intersection of a circumferential groove and a transverse groove, has been found to enhance distinctly the transverse flow of water and to reduce the tire's propensity to hydroplaning. One feature of the flow deflector is its ability to achieve a considerable reduction in vortex formation, resulting in an enhanced discharge of water. The width-reducing feature of the flow deflector constricts a flow in the circumferential groove, whereby the water pressure decreases and the flow rate increases. After this, the water present in the proximity of the flow deflector remains, as far as the flow is concerned, close to a surface of the flow deflector and traces along the surface that continues arcuately into the transverse groove. Thus, the water is more readily "compelled" into the transverse groove and cannot continue its journey along the circumferential groove or along the surface of a tread block.

According to one embodiment, the flow deflector is constructed for directing the water flowing in a circumferential groove, such that the circumferential groove has its reduced-width portion adapted for momentarily changing the pressure and accelerating the flow rate of water flowing in the circumferential groove, as well as for reducing vortex formation, whereby a continuation of the flow deflector in its curve into the transverse groove is designed to change the flowing direction of water from circumferential to transverse. According to one embodiment, the flow deflector is shaped for creating first a venturi effect and then a coanda effect in the flow. The venturi effect makes use of a constriction to provide acceleration of the flow rate and the coanda effect holds the flowing water in "attachment" with a surface of the flow deflector, whereby the flow traces along the flow deflector's surface changing the direction from circumferential to transverse.

According to one preferred embodiment, the circumferential groove has its narrowest point at the location of a flow deflector. Hence, it is ensured that the flow rate in a circumferential groove changes in an exactly appropriate manner precisely at the location of a flow deflector.

There are a few different practices for arranging a flow deflector in the vehicle tire. One embodiment is to position the flow deflector ahead of a transverse groove in the tire rolling direction. A second embodiment is to locate the flow deflector behind a transverse groove in the tire rolling direction. A third embodiment is to place the flow deflector both ahead of and behind a transverse groove in the tire rolling direction. One influential aspect in this choice is whether the question is about a tire with a prescribed rotating direction or whether the question is about a tire of the "inside/outside" type. As the rolling tire crosses over a water layer present on the foundation, there will be flowing in the circumferential groove in either direction, whereby each of these aforementioned embodiments is functional but the effects are slightly different from each other.

BRIEF DESCRIPTION OF THE DRAWINGS

The invention will now be described more precisely with reference to the accompanying figures, in which figures.

DETAILED DESCRIPTION OF THE INVENTION

Figure 1A:
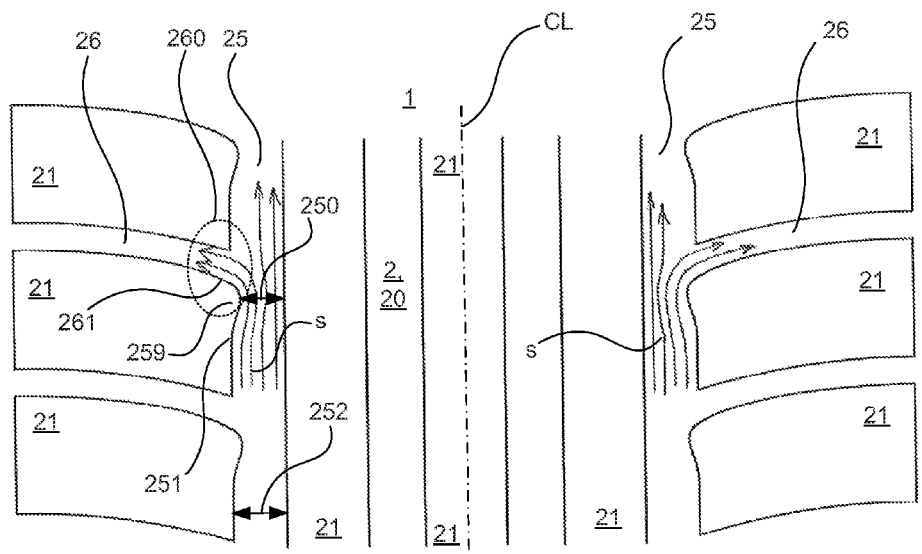
FIG. 1A (FIG. 1A) shows one embodiment of a vehicle tread provided with said flow deflector, FIGS. 1B, 1C, 2A, 2B, 2C, 2Cc, 2Cd and 2D show a few embodiments of the invention.

FIG. 1A shows a vehicle tire 1, comprising a tread 2 which is intended for rolling contact with a foundation, said tread 2 being formed with a tread pattern 20 which comprises circumferential grooves 25 and transverse grooves 26 for removing water from a contact patch between the foundation and the tire 1. The circumferential groove 25 has its wall 251 formed with a flow deflector 259, which reduces the width of the circumferential groove 25 and which commences from the wall 251 of the circumferential groove 25, bypasses a reduced-width portion 250 of the circumferential groove 25, and continues arcuately into the transverse groove 26 and becomes a wall 261 of the transverse groove 26. In FIG. 1A, the flow of water or other fluid or slush in the groove has been demonstrated with flow arrows s, whereby in FIG. 1A (as well as in other figures attached to this specification), the intended advancing direction of a tire hub is in the direction of an arrow C or upward, the tire moving forward in a rolling manner thereby displacing water in front of itself in the motion direction, i.e. in the direction of the flow arrows s. It is indicated by the flow arrows s how the flow is constricted at a location of the flow deflector 259, the distance between the flow arrows s diminishing in the figure. Downstream of the reduced-width portion 250 the flow splits into two directions, some of the flow tracing along the flow deflector's surface that turns into the transverse groove wall 261 and some continuing forward along the circumferential groove 25. The circumferential groove 25 has its narrowest point at a location of the flow deflector 259, whereby elsewhere the width is typically larger as a circumferential groove width is depicted elsewhere in the figure with reference numeral 252.

Furthermore, the flow deflector 259 is constructed for directing the water flowing in a circumferential groove, such that the circumferential groove has its reduced-width portion 250 adapted for momentarily changing the pressure and accelerating the flow rate of water flowing in the circumferential groove 25, as well as for reducing vortex formation, whereby a continuation of the flow deflector 259 in its curve into the transverse groove 26 is designed for changing the flowing direction of water from circumferential to transverse. Most preferably, the flow deflector 259 is shaped to create first a venturi effect and then a coanda effect in the flow.

FIG. 1A shows an embodiment with the flow deflector 259 located ahead of the transverse groove 26 in a rolling direction of the tire 1. According to another embodiment (shown in FIG. 1B), the flow deflector 259 is located behind the transverse groove 26 in a rolling direction of the tire 1. According to a still further embodiment (shown in FIG. 1C), the flow deflector 259 is present both ahead of and behind the transverse groove 26 in a rolling direction of the tire 1.

Figure 2A:
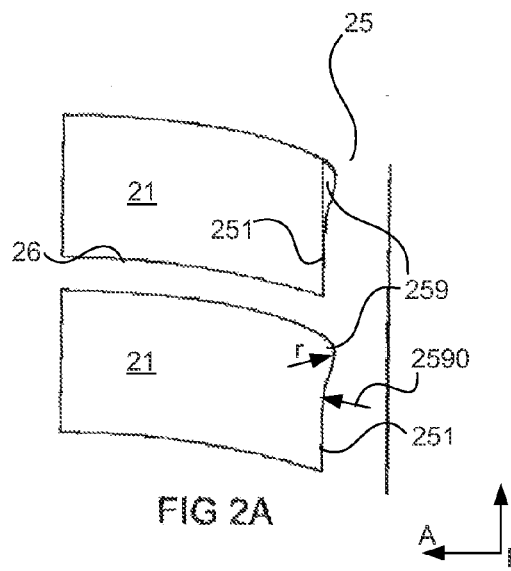

FIGS. 2A, 2B, 2C and 2D depict a variety of embodiments for flow deflectors. Thus, more specifically, in each of the FIGS. 2A-2D is shown an intersection of the circumferential groove 25 and the transverse groove 26. Hence, the illustrated geometries depict two tread blocks 21 and one internal wall of the circumferential groove 25. Between these develops that aforementioned intersection. For the sake of clarity, on the upper tread block of FIG. 2A is drawn a dash-dot line, which in a conventional tread block of the prior art would constitute a side wall 251 of this discussed tread block corresponding to the circumferential groove 251. Thus, the area to the right of the dash-dot line represents in this embodiment the presently discussed flow deflector 259.

FIG. 2A shows a flow deflector in its "basic embodiment", wherein the flow deflector has particularly round shapes enabling a good "adherence" of the flow to a surface of the flow deflector. In this embodiment, the flow deflector 259 is configured to be straight in a depth direction R of the circumferential groove 25 (i.e. perpendicularly to the image plane). In the case of normally used tire sizes for passenger cars, the flow deflector 259 has a radius of curvature r of 2-15 mm. Further, according to a preferred embodiment, the flow deflector 259 has a length which in the direction of a circumferential groove is the width of a transverse groove ±25%. According to one embodiment, the flow deflector 259 has a length which in the direction of the circumferential groove 25 is 40-60% of the length of a respective tread block 21. With such dimensioning, the flow has plenty of time to "develop" along the straight section until the shape of the flow deflector begins to constrict the circumferential groove's width before the next transverse groove.

Still further, the flow deflector 259 according to the embodiment of FIG. 2A consist of an arcuate surface, wherein the circumferential groove 25 has its wall 251 at a point of commencement of the curve formed with a commencement rounding 2590 in an opposite direction with respect to the flow deflector 259. Preferably, this commencement rounding 2590 has a radius of 0.5-5 mm, whereby it does not have any notable effect on vortex formation.

Figure 1B:
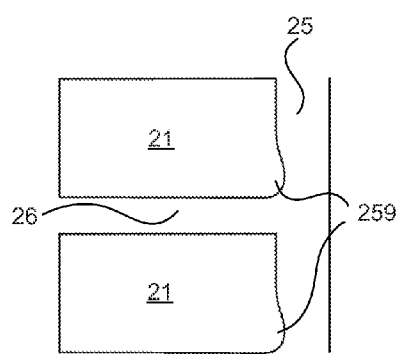
Figure 1C:
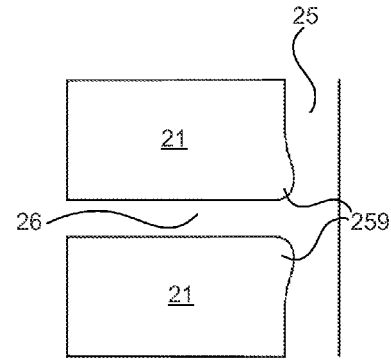
Figure 2B:
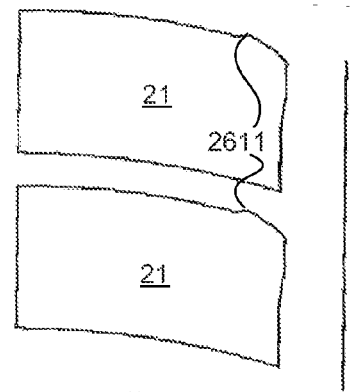

FIG. 1B shows an embodiment which matches to a large extent the embodiment shown in FIG. 2A, but whose shapes are slightly more angular, i.e. the employed rounding radii are smaller than those depicted in FIG. 2A. As a particular feature can be noted the location at which the flow deflector 259 turns into the wall 261 of a transverse groove. In this embodiment, that location is designed to comprise a release edge 2611, i.e. a point at which the flow readily disengages from the wall 261 of a transverse groove and becomes vigorously turbulent. In the embodiments of FIGS. 2A and 2B, the flow deflector 259 is designed to be co-directional with a wall 251, 261 of the tread block 21 in a depth direction R of the circumferential groove 25.

Figure 2C:
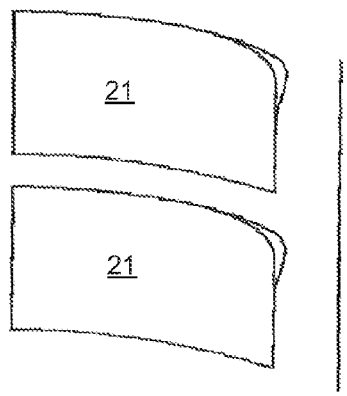

The embodiment shown in FIG. 2C has a shape which in plan view matches the embodiment shown in FIG. 2A, but in which the flow deflector 259 is designed to be convex in a depth direction R of the circumferential groove 25. In FIG. 2C, this same feature is depicted as seen from the direction of the circumferential groove 25, clearly demonstrating said depth-directed convexity or curvature. According to one embodiment, the depth-directed convexity in terms of its radius is 25-100% of the groove depth of a new tire. Thereby, the flow can also be affected in the depth direction of grooves 25, 26.

FIG. 2Cd shows one embodiment, in which the flow deflector 259 is designed to be wedge-shaped or convexly wedge-shaped with a wall 251, 261 of the tread block 21 in a depth direction R of the circumferential groove 25. This is another way of affecting the flow also in the depth direction of grooves 25, 26.

Figure 2D:
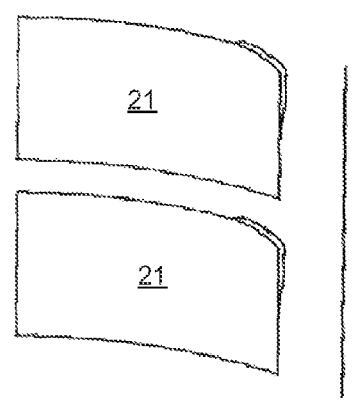
Figure 2C:
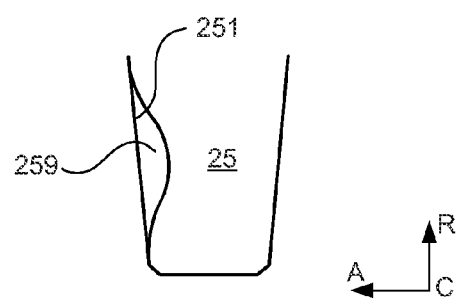
Figure 2C:
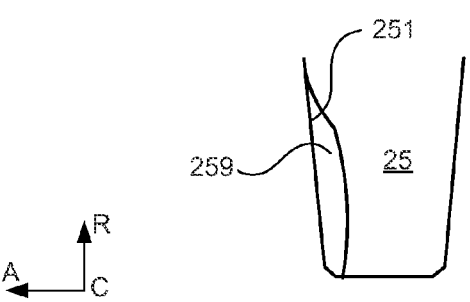

The embodiment shown in FIG. 2D has a shape which in plan view matches FIG. 2B, but features a depth-directed convexity similar to FIG. 2Cc or 2Cd. The effect is similar to what has been described above.

The foregoing embodiments are particularly well applicable to vehicle tires, in which the transverse groove 26 has its direction with respect to an axial direction A of the tire 1 at an angle of about α=0°, yet α≤±15°. Particularly in a tire constructed with the "inside/outside" geometry of undetermined rotating direction, the presented solution works well. The vehicle tire manufacturer determines when the tire is an "inside/outside" tire model, whereby it is designated to be installed on the vehicle with a predetermined side outward.

The invention and its various embodiments are not limited to the foregoing exemplary embodiments. The presented individual features may appear in a solution according to the invention regardless of other presented individual features. The expressions included in the claims and reflecting the existence of characterizing features are open in the sense that the presentation of characterizing features does not exclude from the solution such characterizing features which have not been presented in the independent or dependent claims.

REFERENCE NUMERALS PRESENTED IN THE FIGURES 1 vehicle tire
2 tread
20 tread pattern
21 tread block
25 circumferential groove
250 reduced-width portion
251 wall of a circumferential groove
252 width of a circumferential groove (anywhere but at a location of the flow deflector)
259 flow deflector
2590 commencement rounding of flow deflector
26 transverse groove
260 transverse groove end closer to equatorial line
261 wall of a transverse groove
A axial direction
C circumferential direction
R radial direction (i.e. depth direction of the grooves)
CL equatorial line of a tire
r curvature of the flow deflector
s flow line

The invention claimed is:

1. A vehicle tire (1), comprising a tread (2) which is intended for rolling contact against a foundation, said tread (2) being formed with a tread pattern (20) which comprises circumferential grooves (25) and transverse grooves (26) for removing water from a contact patch between the foundation and the tire (1), wherein the circumferential groove (25) has its wall (251) formed with a flow deflector (259) reducing a width of the circumferential groove (25), commencing from the wall (251) of the circumferential groove (25), bypassing a reduced-width portion (250) of the circumferential groove (25), and continuing arcuately into the transverse groove (26) so as to turn into a wall (261) of the transverse groove (26), wherein the flow deflector (259) is constructed to be convex in a depth direction R of the circumferential groove (25).

2. A vehicle tire (1) according to claim 1, wherein the flow deflector (259) is constructed for directing the water flowing in a circumferential groove, such that the circumferential groove has its reduced-width portion (250) adapted for momentarily changing the pressure and accelerating the flow rate of water flowing in the circumferential groove (25), as well as for reducing vortex formation, whereby a continuation of the flow deflector (259) in its curve into the transverse groove (26) is designed to change the flowing direction of water from circumferential to transverse.

3. A vehicle tire (1) according to claim 1 wherein the flow deflector (259) is shaped for creating first a venturi effect and then a coanda effect in the flow.

4. A vehicle tire (1) according to claim 1 wherein the circumferential groove (25) has its narrowest point at a location of the flow deflector (259).

5. A vehicle tire (1) according to claim 1 wherein the flow deflector (259) is located ahead of the transverse groove (26) in a rolling direction of the tire (1).

6. A vehicle tire (1) according to claim 1 wherein the flow deflector (259) is located behind the transverse groove (26) in a rolling direction of the tire (1).

7. A vehicle tire (1) according to claim 1 wherein the flow deflector (259) is located both ahead of and behind the transverse groove (26) in a rolling direction of the tire (1).

8. A vehicle tire (1) according to claim 1 wherein the flow deflector (259) has a radius of curvature of 2-15 mm.

9. A vehicle tire (1) according to claim 1 wherein the flow deflector (259) has a length which in a direction of the circumferential groove (25) is the width of a transverse groove ±25%.

10. A vehicle tire (1) according to claim 1 wherein the flow deflector (259) has a length which in a direction of the circumferential groove (25) is 40-60% of the length of a respective tread block (21).

11. A vehicle tire (1) according to claim 1 wherein the transverse groove (26) has a direction which relative to an axial direction (A) of the tire (1) is at an angle of about α=0°, yet α≤±15°.

12. A vehicle tire (1) according to claim 1 wherein the circumferential groove (25) has its wall (251) at a point of commencement of the curve formed with a commencement rounding (2590) in an opposite direction with respect to a curve (r) of the flow deflector (259).

13. A vehicle tire (1) according to claim 12, wherein the commencement rounding (2590) has a radius of 0.5-5 mm.

14. A vehicle tire (1) according to claim 1, wherein the depth-directed convexity in terms of its radius is 25-100% of the groove depth of a new tire.

15. A vehicle tire (1) comprising a tread (2) which is intended for rolling contact against a foundation, said tread (2) being formed with a tread pattern (20) which comprises circumferential grooves (25) and transverse grooves (26) for removing water from a contact patch between the foundation and the tire (1), wherein the circumferential groove (25) has its wall (251) formed with a flow deflector (259) reducing a width of the circumferential groove (25), commencing from the wall (251) of the circumferential groove (25), bypassing a reduced-width portion (250) of the circumferential groove (25), and continuing arcuately into the transverse groove (26) so as to turn into a wall (261) of the transverse groove (26), wherein the flow deflector (259) is constructed to be wedge-shaped or convexly wedge-shaped relative to a wall (251, 261) of a tread block (21) in a depth direction R of the circumferential groove (25).

* * * * *